US006498736B1

(12) United States Patent
Kamath

(10) Patent No.: US 6,498,736 B1
(45) Date of Patent: Dec. 24, 2002

(54) HARMONIC FILTER WITH LOW COST MAGNETICS

(75) Inventor: Girish Radhakrishna Kamath, St. Paul, MN (US)

(73) Assignee: Baldor Electric Company, Fort Smith, AR (US)

( * ) Notice: Subject to any disclaimer, the term of this patent is extended or adjusted under 35 U.S.C. 154(b) by 0 days.

(21) Appl. No.: 09/818,068

(22) Filed: Mar. 27, 2001

(51) Int. Cl.[7] .................................................. H02M 1/14
(52) U.S. Cl. ............................................ 363/44; 363/70
(58) Field of Search .............................. 363/44, 70, 90, 363/126

(56) References Cited

U.S. PATENT DOCUMENTS 4,030,017 A * 6/1977 Brown
4,330,818 A * 5/1982 Peschel ...................... 363/126

(List continued on next page.)

FOREIGN PATENT DOCUMENTS

WO WO9819385 5/1998 ............ H02M/7/08

*Primary Examiner*—Jeffrey Sterrett
(74) *Attorney, Agent, or Firm*—Thompson Coburn LLP; Caroline G. Chicoine

(57) ABSTRACT

A system and method for reducing harmonics in a circuit is disclosed. The system comprises a main rectifier, $$\left(\frac{n}{3}-1\right)$$

auxiliary rectifiers connected to the main rectifier, and an autotransformer connected to both the main rectifier and the auxiliary rectifiers which provides 2n-pulse rectification where n equals the number of phases of the system. The autotransformer generates $$\left(\frac{n}{3}-1\right)$$

auxiliary voltage sets, each auxiliary voltage set having an auxiliary voltage amplitude, k, and an auxiliary voltage phase, α, wherein $$k=\sqrt{4+2\sqrt{3}\cos\left(\theta-\frac{7\pi}{6}\right)}$$

and wherein $$\alpha=\sin^{-1}\left(\frac{\sqrt{3}\sin\theta-0.5}{k}\right)$$

assuming a main voltage amplitude of one and a main voltage phase of ninety degrees, wherein $$\theta=\frac{180°}{n}$$

and its integral multiples for all possible real values of k. The main rectifier has a main rectifier power rating, $P_{mdb}$ wherein $$P_{mdb}\geq\left(\frac{n+3}{2n}\right)$$

times the load power, and the auxiliary rectifiers each have an auxiliary power rating, $P_{auxdb}$, wherein $$P_{auxdb}\leq\left(\frac{3}{2n}\right)$$

times the load power.

37 Claims, 11 Drawing Sheets

U.S. PATENT DOCUMENTS 4,866,591 A * 9/1989 Cook et al. .................. 363/70
4,876,634 A * 10/1989 Paice ......................... 363/126
5,124,904 A 6/1992 Paice ........................... 363/3
5,455,759 A * 10/1995 Paice ......................... 363/126
5,619,407 A 4/1997 Hammond .................. 363/155
5,625,543 A * 4/1997 Barrett ........................ 363/44
5,903,066 A * 5/1999 Enjeti et al. .................. 363/44
6,101,113 A 8/2000 Paice ......................... 363/126

* cited by examiner

HARMONIC FILTER WITH LOW COST MAGNETICS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to a system and method for reducing harmonics in a circuit, and in particular, to an autotransformer-based system and method of current harmonics reduction in a circuit.

AC to DC conversion is used in various applications such as motor drives. A three-phase diode bridge is a typical example of an AC to DC converter. These devices draw line currents that are rich in harmonics during the conversion process. With the widespread use of such non-linear devices to satisfy our technological needs, it has become necessary to tackle problems associated with current harmonics such as overheating of distribution transformers, transmission lines, voltage distortion and power system instability, all of which can lead to power system breakdowns. This has become all the more imperative due to the growing presence of loads that need good quality power such as computers.

Several methods have been developed over the years to reduce line current harmonics. One approach specifically geared towards diode bridge type loads is to increase the number of line phases connected to the diode bridge and hence the number of rectification pulses. However the use of bulky line frequency magnetics is a drawback. In addition, increasing the number of pulses to achieve greater harmonic current reduction usually results in complicated transformer construction and an increase in cost and size.

FIG. 1 shows the schematic diagram of a conventional wye-wye-delta transformer based 12-pulse rectification scheme. The delta-connected windings of the transformer produce a new set of three-phase voltages that lead by 30° with respect to the wye-connected winding voltages. Additional line inductors may be inserted in both lines to further reduce line current distortion. In this case, the entire load power flows through the transformer windings resulting in a bulky and costly solution.

The configuration in FIG. 2 uses a wye-delta transformer to produce a second set of three phases that is 30° out of phase with respect to the mains line-voltages. As shown, the mains lines are connected directly to one of the diode bridges. As compared to the transformer of FIG. 1, the wye-delta transformer is rated for only half the load power and hence is smaller in size. However, the diode bridges have to share power equally in order to achieve good harmonic cancellation. For this, inductors have to be inserted in the main lines. This is done to match the leakage impedance of the wye-delta transformer and act as line impedance to the second diode bridge.

In the 12-pulse scheme shown in FIG. 3 and further described in U.S. Pat. No. 6,101,113, an autotransformer is used to generate the second three-phase set. The use of an autotransformer reduces the overall size of the scheme. However the new set of voltages generated through the transformer is not isolated with respect to the original mains inputs. This can cause undesirable interaction between the voltages in either set. Such an interaction takes place through the diode bridge connections and results in the flow of triplen harmonic currents in the system. As a result, true 12-pulse operation is inhibited. In order to prevent interaction between the two voltage sets, a zero-sequence-blocking transformer, which provides a high zero-sequence impedance to triplen harmonic currents, or an autotransformer constructed on a four-limb core must be used. In both cases, this significantly increases the overall size and cost of the scheme. Further, like in the other conventional schemes shown in FIGS. 1 and 2, this scheme requires equal power sharing between the diode bridges for good harmonic current reduction. Hence, matched line impedances are required at both diode bridge inputs.

Not only is the reduction of line harmonics desirable, current standards for industrial and residential power electronic equipment such as IEC-555 and EN-61000 require that these be within limits. These standards are now being widely followed in Europe. In the US, IEEE-519 recommendations setting limits on harmonic current generation and source voltage distortion by power electronic equipment are being followed on a voluntary basis.

The present invention overcomes the drawbacks present in existing schemes. In particular, the invention uses interaction between the auxiliary voltages generated by the autotransformer and the main voltages to generate additional three phase voltage sets suitable for increased pulse rectification operation, thus obviating the need for special transformer construction, additional magnetics like zero-sequence-blocking devices, and equal power sharing between diode bridges. Since the autotransformer of the present invention is used exclusively for harmonic current reduction and not for load power delivery, it has a power rating significantly smaller than the transformers used in existing rectification schemes. This in turn results in an extremely simple autotransformer configuration that is compact, cost-effective and rugged and which provides an ideal retrofit solution that fully utilizes the rating of the diode bridge present in an existing load device connected thereto. The present invention also meets the performance objectives specified in IEEE 519 recommendations for sources with impedance 2% or less.

SUMMARY OF THE INVENTION

It is in view of the above problems that the present invention is developed. The present invention is directed towards a system for reducing harmonics in a circuit, the circuit being powered by a main three phase power source having a main three phase voltage set, each main phase voltage having a main voltage amplitude and a main voltage phase. The system comprises a main rectifier, an auxiliary rectifier connected to the main rectifier, and an autotransformer connected to the main rectifier and the auxiliary rectifier, the autotransformer adapted to generate a set of three-phase auxiliary voltages, each auxiliary voltage having an auxiliary voltage amplitude and phase, the auxiliary voltage amplitude ranging between 0.70 and 0.75 times the main voltage amplitude, and the auxiliary voltage phase ranging between 55 and 65 degrees out of phase with the main voltage phase, whereby twelve pulse rectification is achieved. The main rectifier has a main rectifier power and the auxiliary rectifier has an auxiliary rectifier power such that the main rectifier power and the auxiliary rectifier power are not substantially equal. In one embodiment, the system is adapted to connect to a load having a load power, wherein the main rectifier power is at least seventy-five percent of the load power.

The autotransformer comprises a plurality of primary windings connected in a delta configuration, and a plurality of secondary windings, each of the secondary windings being electrically connected to a primary winding and magnetically coupled to a different primary winding. The plurality of primary windings comprises a first primary winding, a second primary winding and a third primary winding, and the plurality of secondary windings comprises a first secondary winding, a second secondary winding and a third secondary winding, and wherein the first secondary winding is electrically connected to the first primary winding and magnetically coupled to the third primary winding, the second secondary winding is electrically connected to the second primary winding and magnetically coupled to the first primary winding, and the third secondary winding is electrically connected to the third primary winding and magnetically coupled to the second primary winding.

The system may further comprise a main choke connected between the autotransformer and the main rectifier and an auxiliary choke connected between the autotransformer and the auxiliary rectifier. Alternatively, a choke may be connected between the power source and the autotransformer. In one embodiment, the main rectifier and the auxiliary rectifier are three phase diode bridges, each having three ac inputs and two dc outputs such that the ac inputs of the main diode bridge are connected to the main power source via the primary windings of the autotransformer, the ac inputs of the auxiliary diode bridge are connected to the secondary windings of the autotransformer, and the dc outputs of the main diode bridge and the auxiliary diode bridge are connected in parallel.

The present invention is also directed to a system for reducing harmonics in such a circuit, wherein the system comprises a main rectifier, a first auxiliary rectifier connected to the main rectifier, a second auxiliary rectifier connected to the main rectifier and the first auxiliary rectifier, and an autotransformer connected to the main rectifier, the first auxiliary rectifier, and the second auxiliary rectifier, the autotransformer adapted to generate a first and second set of three-phase auxiliary voltages, each first set of auxiliary voltages having a first auxiliary voltage amplitude and a first auxiliary voltage phase and each second set of auxiliary voltages having a second auxiliary voltage amplitude and a second auxiliary voltage phase, the first and second auxiliary voltage amplitude ranging between 0.73 and 0.78 times the main voltage amplitude, and the first auxiliary voltage phase ranging between 35 and 40 degrees leading with respect to the main voltage phase, and the second auxiliary voltage phase being between 35 and 40 degrees lagging with respect to the main voltage phase, whereby eighteen pulse rectification is achieved.

The plurality of primary windings of the autotransformer comprises a first primary winding, a second primary winding and a third primary winding, and the plurality of secondary windings of the autotransformer comprises a first secondary winding, a second secondary winding, a third secondary winding, a fourth secondary winding, a fifth secondary winding and a sixth secondary winding, and wherein the first secondary winding is electrically connected to the first primary winding and magnetically coupled to the third primary winding, the second secondary winding is electrically connected to the second primary winding and magnetically coupled to the first primary winding, the third secondary winding is electrically connected to the third primary winding and magnetically coupled to the second primary winding, the fourth secondary winding is electrically connected to the first primary winding and magnetically coupled to the second primary winding, the fifth secondary winding is electrically connected to the second primary winding and magnetically coupled to the third primary winding, and the sixth secondary winding is electrically connected to the third primary winding and magnetically coupled to the first primary winding. The main rectifier has a main rectifier power, the first auxiliary rectifier has a first auxiliary rectifier power, and the second auxiliary rectifier has a second auxiliary rectifier power such that the main rectifier power is not substantially equal to either the first or second auxiliary rectifier power. In one embodiment, the system is adapted to connect to a load having a load power, wherein the main rectifier power is at least 66 percent of the load power, and wherein the remainder of the load power is shared substantially equally between the first auxiliary rectifier and the second auxiliary rectifier.

The system may further comprise a main choke connected between the autotransformer and the main rectifier, a first auxiliary choke connected between the autotransformer and the first auxiliary rectifier, and a second main choke connected between the autotransformer and the second auxiliary rectifier. Alternatively, a choke may be connected between the power source and the autotransformer. In one embodiment, the main rectifier, the first auxiliary rectifier and the second auxiliary rectifier are three phase diode bridges, each having three ac inputs and two dc outputs such that the ac inputs of the main rectifier are connected to the main power source via the primary windings of the autotransformer, the ac inputs of the first auxiliary rectifier are connected to the first, second and third secondary windings of the autotransformer, the ac inputs of the second auxiliary rectifier are connected to the fourth, fifth and sixth secondary windings of the autotransformer, and the dc outputs of the main diode bridge, the first auxiliary diode bridge, and the second auxiliary diode bridge are connected in parallel.

The present invention is also directed to the autotransformer itself.

The present invention is also directed to a method of reducing harmonics in such a circuit. The method comprises the steps of connecting a plurality of primary windings in a delta configuration, and connecting a plurality of secondary windings to the plurality of primary windings, each of the secondary windings being electrically connected to a primary winding and magnetically coupled to a different primary winding such that the autotransformer generates a set of three-phase auxiliary voltages, each auxiliary voltage having an auxiliary voltage amplitude and phase, the auxiliary voltage amplitude ranging between 0.70 and 0.75 times the main voltage amplitude, and the auxiliary voltage phase ranging between 55 and 65 degrees out of phase with the main voltage phase.

Alternatively, the method may comprise connecting a plurality of primary windings in a delta configuration, and connecting a plurality of secondary windings to the plurality of primary windings, each of the secondary windings being electrically connected to a primary winding and magnetically coupled to a different primary winding such that the autotransformer generates a first and second set of three-phase auxiliary voltages, each first set of auxiliary voltages having a first auxiliary voltage amplitude and a first auxiliary voltage phase and each second set of auxiliary voltages having a second auxiliary voltage amplitude and a second auxiliary voltage phase, the first and second auxiliary voltage amplitudes ranging between 0.73 and 0.78 times the main voltage amplitude, the first auxiliary voltage phase ranging between 35 and 40 degrees leading with respect to the main voltage phase, and the second auxiliary voltage phase ranging between 35 and 40 degrees lagging with respect to the main voltage phase.

The present invention is also directed to an autotransformer-based 2n-pulse rectification system having n phases and being powered by a main three phase power source having a main three phase voltage set, each main three phase voltage set having a main voltage amplitude and a main voltage phase. The system comprises a main rectifier, $$\left(\frac{n}{3}-1\right)$$

auxiliary rectifiers connected C to the main rectifier, and an autotransformer connected to the main rectifier and the $$\left(\frac{n}{3}-1\right)$$

auxiliary rectifiers, the autotransformer adapted to generate $$\left(\frac{n}{3}-1\right)$$

three-phase auxiliary voltage sets, each auxiliary voltage set having an auxiliary voltage amplitude, k, and an auxiliary voltage phase, α, wherein $$k=\sqrt{4+2\sqrt{3}\cos\left(\theta-\frac{7\pi}{6}\right)}$$

and wherein $$\alpha=\sin^{-1}\left(\frac{\sqrt{3}\sin\theta-0.5}{k}\right)$$

assuming a main voltage amplitude of one and a main voltage phase of ninety degrees, wherein $$\theta=\frac{180°}{n}$$

and its integral multiples for all possible real values of k.

The autotransformer comprises a plurality of primary windings connected in a delta configuration, and (n−3) secondary windings, each of the secondary windings being electrically connected to a primary winding and magnetically coupled to a different primary winding. The system may further comprise a main choke connected between the autotransformer and the main rectifier and $$\left(\frac{n}{3}-1\right)$$

auxiliary chokes connected between the autotransformer and the n auxiliary rectifiers. Alternatively, a choke is connected between the power source and the autotransformer. In one embodiment, the main rectifier and the $$\left(\frac{n}{3}-1\right)$$

auxiliary rectifiers are three phase diode bridges, each having three ac inputs and two dc outputs such that the ac inputs of the main diode bridge are connected to the main power source via the primary windings of the autotransformer, and the ac inputs of each $$\left(\frac{n}{3}-1\right)$$

auxiliary diode bridge are connected to the secondary windings of the autotransformer, and the dc outputs of the main diode bridge and each $$\left(\frac{n}{3}-1\right)$$

auxiliary diode bridge are connected in parallel.

Finally, the present invention is directed to an autotransformer-based 2n-pulse rectification system having n phases for connection to a load having a load power. The system comprises a main rectifier having a main rectifier power rating, $P_{mdb}$, wherein $$P_{mdb}\geq\left(\frac{n+3}{2n}\right)$$

times the load power, $$\left(\frac{n}{3}-1\right)$$

auxiliary rectifiers connected to the main rectifier and having an auxiliary rectifier power rating, $P_{auxdb}$, wherein $$P_{auxdb}\leq\left(\frac{3}{2n}\right)$$

times the load power, and the autotransformer connected to the main rectifier and the $$\left(\frac{n}{3}-1\right)$$

auxiliary rectifiers.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

The present invention relates to an autotransformer-based n-pulse rectification system for reducing harmonics in a circuit, where "n" represents the number of phases thereof. For the purposes of illustration only, the invention will be fully described with respect to 12 pulse and 18 pulse rectification systems. However, it can be appreciated that the invention can be incorporated in any multiple-pulse rectification system.

Figure 4:
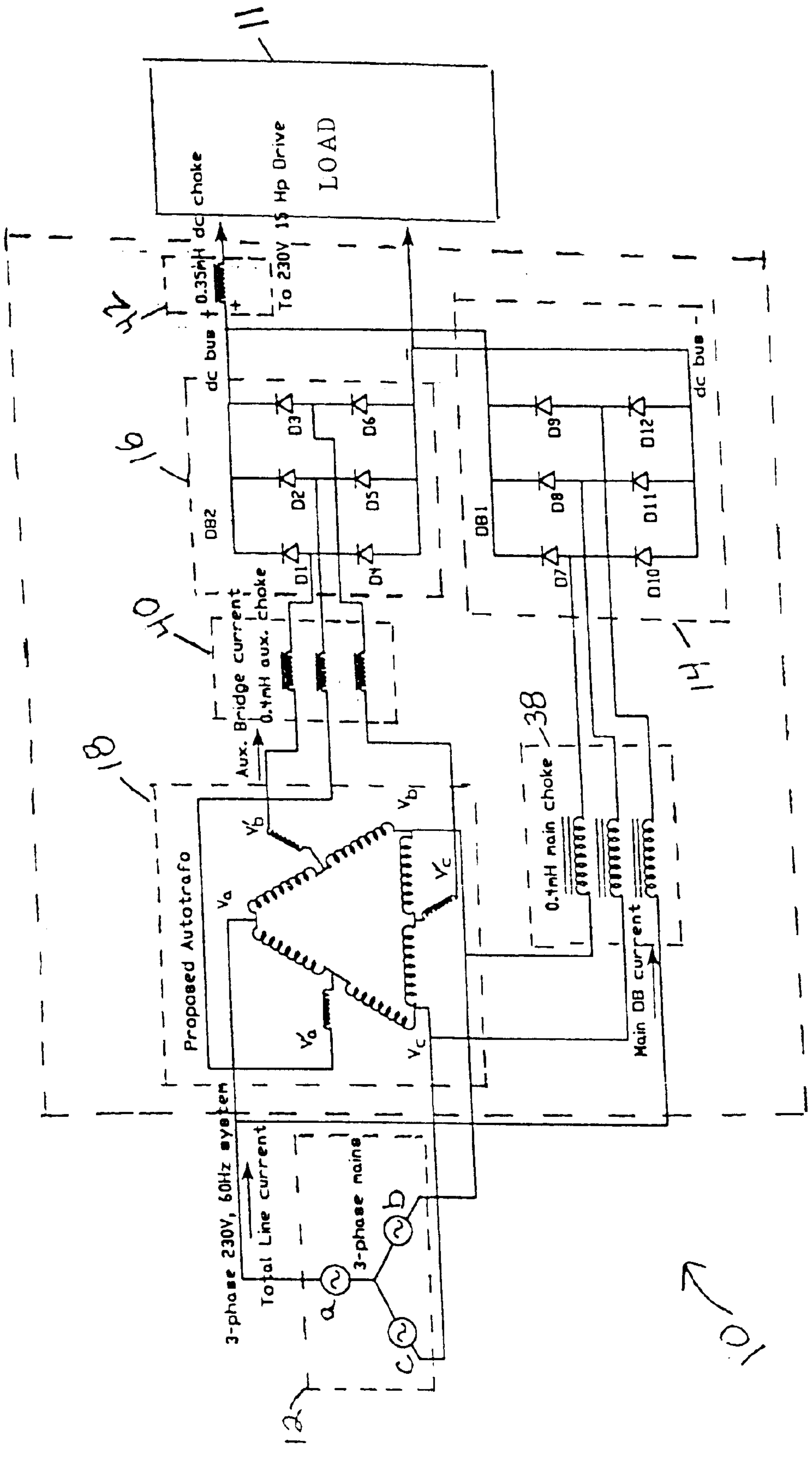
FIG. 4 is a schematic diagram of a 12 pulse rectification system in accordance with the present invention.

FIG. 4 shows an autotransformer-based 12 pulse rectification system 10 in accordance with the present invention. System 10 is operated by a three phase main power source 12 and is connected to a load 11 having a load power. The power source 12 has a main three phase voltage set consisting of $v_a$, $v_b$, and $v_c$ wherein each main phase voltage has a main voltage amplitude and a main voltage phase.

System 10 includes a main rectifier mechanism 14, an auxiliary rectifier mechanism 16, and an autotransformer 18. For the purposes of discussion throughout this application, the rectifier mechanism will be described with respect to a three-phase diode bridge. However, it can be appreciated by one skilled in the art that any mechanism providing rectification such as full-controlled and half-controlled rectifiers may be used. The main diode bridge 14 comprises three AC inputs and two DC outputs. In particular, three pairs of serially connected diodes are connected in parallel across the DC outputs, with the AC inputs connecting to the power source 12 through the autotransformer 18 to the midpoints of each pair of serially connected diodes. The main diode bridge 14 carries a significant portion of the load power, preferably at least seventy-five (75) percent thereof, most of it directly from the main power source 12. The auxiliary diode bridge 16 also comprises three AC inputs and two DC outputs. In particular, three pairs of serially connected diodes are connected in parallel across the DC outputs, with the AC inputs connecting the autotransformer 18 to the midpoints of each pair of serially connected diodes. The auxiliary diode bridge 16 carries the remainder of the load power (i.e., preferably no more than twenty-five (25) percent thereof).

The system 10 may include a main choke 38 connected between the power source 12 and the main diode bridge 14, and an auxiliary choke 40 connected between the auxiliary diode bridge 16 and the autotransformer 18 to act as a filter to further reduce the harmonics of the system. In a preferred embodiment, the main and auxiliary chokes are three-phase inductors. Alternatively, the system 10 may include a choke (not shown) connected between the power source 12 and the autotransformer. The system 10 may also include a dc choke 42 connected between one of the DC terminals of the auxiliary diode bridge and the load 11 for further current harmonic reduction.

Figure 5:
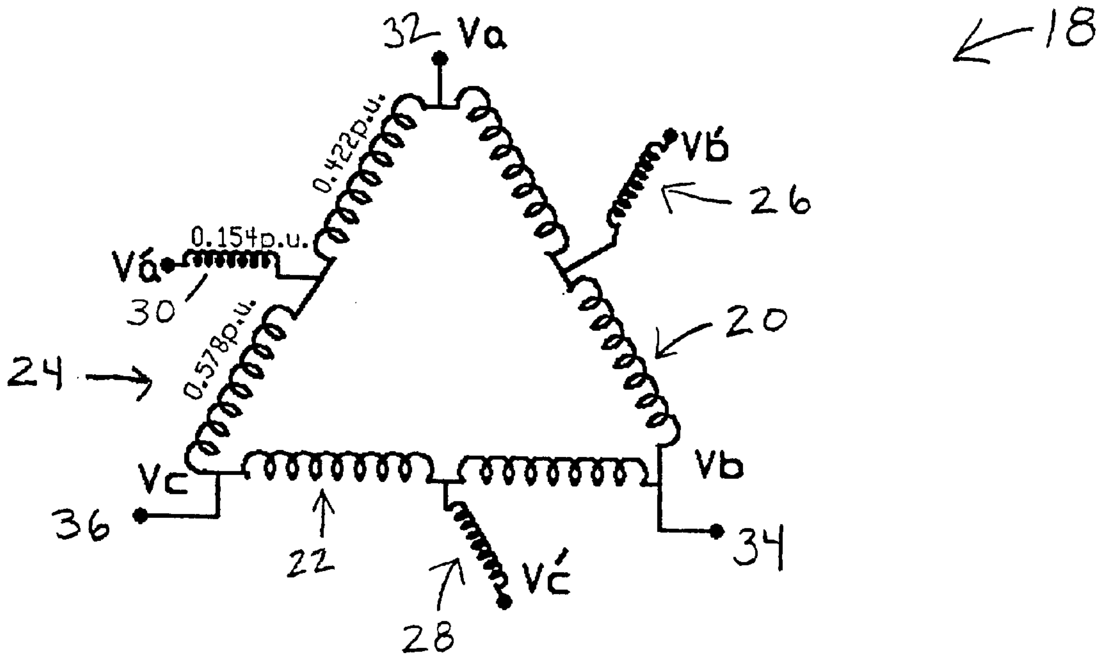
FIG. 5 is a schematic diagram of the autotransformer of FIG. 4.

Referring now to FIG. 5, the autotransformer 18 has two windings per phase. In particular, autotransformer 18 comprises a plurality of primary windings 20, 22 and 24 connected in a delta configuration, and a plurality of secondary windings 26, 28 and 30, each secondary winding being electrically connected to a primary winding and magnetically coupled to a different primary winding. Each primary winding has a line voltage. In particular, primary winding 20 has a line voltage $V_{ab}$, primary winding 22 has a line voltage $V_{bc}$, and primary winding 24 has a line voltage $V_{ac}$. Secondary winding 26 is electrically connected to primary winding 20 and magnetically coupled to primary winding 24, secondary winding 28 is electrically connected to primary winding 22 and magnetically coupled to primary winding 20, and secondary winding 30 is electrically connected to primary winding 24 and magnetically coupled to primary winding 22. The autotransformer 18 connects to the power source 12 and the AC inputs of the main diode bridge 14 through its apices 32, 34 and 36. The autotransformer 18 connects to the AC inputs of auxiliary diode bridge 16 through its secondary windings.

Figure 6:
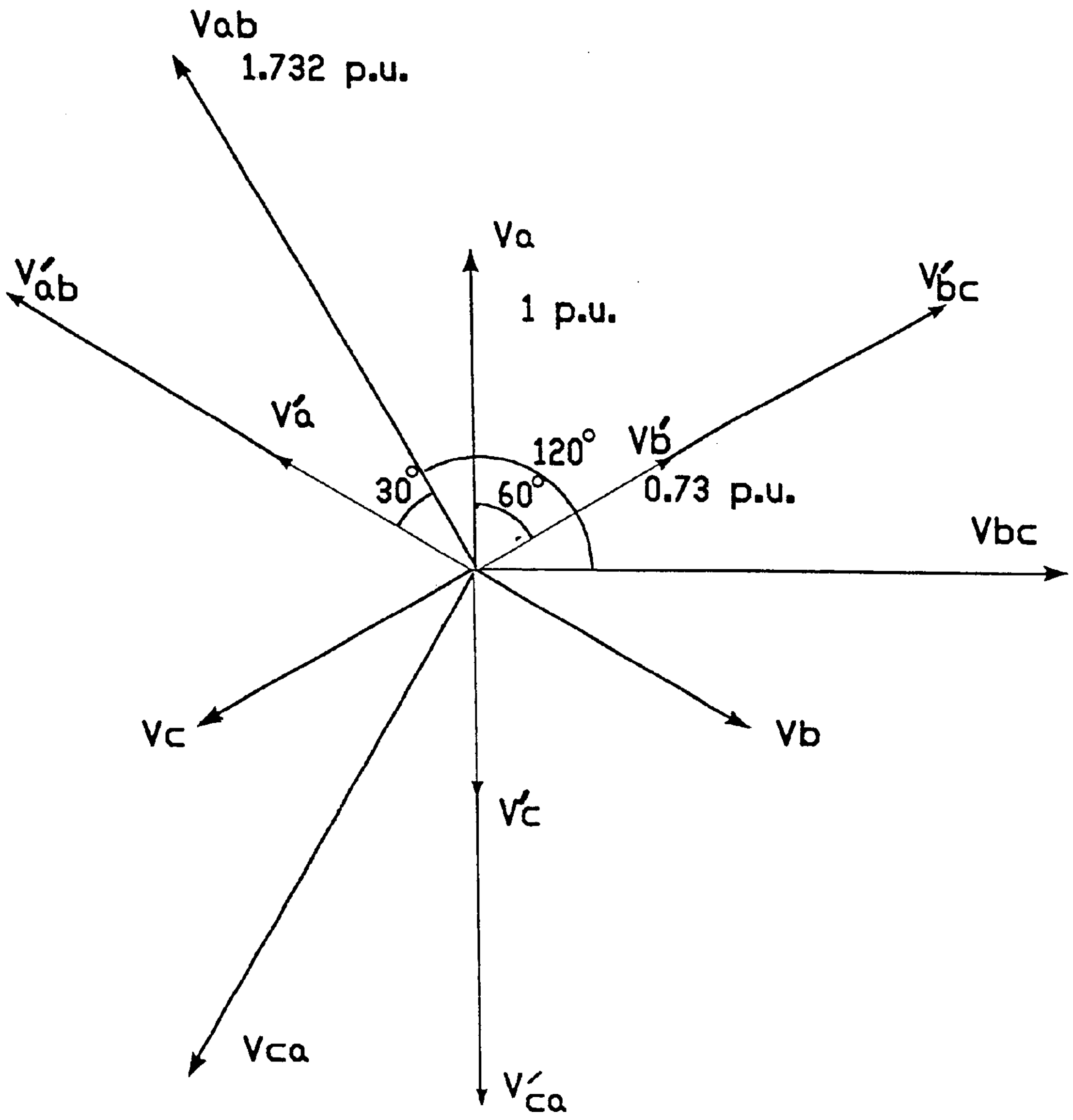
FIG. 6 is a voltage phasor diagram of the main voltages, the auxiliary voltages and the line voltages of FIG. 5.

The autotransformer generates a set of auxiliary voltages $v_a'$, $v_b'$, and $v_c'$ from the secondary windings. The voltage phasor diagram of FIG. 6 shows the relationship between the main phase voltages $v_a$, $v_b$, and $v_c$, the line voltages $v_{ab}$, $v_{bc}$, $v_{ca}$ and the auxiliary voltages $v_a'$, $v_b'$, and $v_c'$. The phase and amplitude relationships between the main phase voltages and the line voltages are listed below:

$$v_a=1\angle 90$$

$$v_b=1\angle 330$$

$$v_c=1\angle 210$$

$$v_{ab}=1.732\angle 120$$

$$v_{ca}=1.732\angle 240$$

$$v_{bc}=1.732\angle 0$$

where the amplitude of $v_a$=1 per unit (p.u.). The auxiliary voltage amplitude ranges between 0.70 and 0.75 times the main voltage amplitude and preferably is approximately 0.732 times the main voltage amplitude. The auxiliary voltage phase ranges between 55 and 65 degrees out of phase with the main voltage phase, and is preferably approximately 60 degrees out of phase therewith.

System 10 uses the line voltages $v_{ab}$, $v_{bc}$, and $v_{ca}$ to form one of the two three-phase voltage sets needed for twelve (12) pulse rectification. The load power that flows through this voltage set comes directly from the main power source 12, which helps minimize and significantly reduce the power rating of the autotransformer 18 as compared with that of transformers used in existing rectification schemes. In addition, unlike previous rectification schemes, interaction between the main and auxiliary voltages is used rather than prevented to produce the second three phase voltage set, $v'_{ab}$, $v'_{ca}$, $v'_{bc}$, necessary for twelve (12) pulse rectification. This second set of voltages is a function of both the main phase voltages and the auxiliary voltages as set forth below:

$$v'_{ab}=v'_a-v_b=1.732\angle 150$$

$$v'_{ca}=v'_c-v_a=1.732\angle 270$$

$$v'_{bc}=v'_b-v_c=1.732\angle 30.$$

It can be seen that this new three phase voltage set has an amplitude equal to the amplitude of the main voltages in addition to being 30° (lead) out of phase therewith. Since it is not necessary to combat the interaction between the main and auxiliary voltages as required under previous rectification schemes, the present invention enables use of a compact autotransformer suitable for 12-pulse rectification without the need for any special zero-sequence current blocking measures.

The relationship between the various voltages mentioned above is shown in connection with the equations provided below:

$$v'_a=v_a+k_1*v_{ca}+k_2\cdot v_{cb}$$

$$v'_b=v_b+k_1*v_{ab}+k_2\cdot v_{ac}$$

$$v'_c=v_c+k_1*v_{bc}+k_2\cdot v_{ba}$$

where, based on the various voltage amplitudes previously set forth herein, $k_1$=0.422 and $k_2$=0.154. Thus, as shown in FIG. 5, each primary winding of the autotransformer 18 is tapped at 0.422 times the line voltage thereof to receive the corresponding secondary winding. The secondary winding is in turn approximately 0.154 times the line voltage.

The system of FIG. 4 will now be described in connection with a 230V, 60 Hz powered three phase system having a 3-phase transformer, the per phase winding details of which are as follows:

1) Primarywinding: 0-100-140-240V, 10A

2) Secondary winding: 32V, 20A.

The DC outputs of the main and auxiliary diode bridges are connected to the DC inputs of a 230 Volt, 15 HP Baldor Electric G3-B 215 drive. The drive outputs are further connected to a 20 HP motor-generator set for loading purposes. The main diode bridge line inductance is 0.4 mh (0.06 p.u.), the DC choke is 0.35 mh (0.05 p.u.), the auxiliary choke is 0.4 mh (0.06 p.u.).

Table 1 below contains values of the various parameters obtained at different motor loads (where "rms"=root mean square, A=amps, "THD"=total harmonic distortion, and "dc"=average):

TABLE 1

| Motor current | Line current | | Main Diode Bridge | Aux. Diode Bridge | DC choke | |
|---|---|---|---|---|---|---|
| (A) | Rms | THD | current (A) | current (A) | rms. | dc |
| 23.7 | 17.3 | 17 | 14.3 | 9.5 | 20.9 | 20.5 |
| 29.6 | 24.4 | 13 | 21.8 | 13.3 | 30.0 | 29.8 |
| 44 | 38 | 11 | 34.2 | 18.6 | 47.9 | 47.6 |
| 48 | 42.3 | 10.3 | 36.9 | 19.3 | 52.5 | 52.2 |
| 50 | 43.9 | 10.1 | 37.5 | 19.2 | 54.7 | 54.5 |

Figure 10:
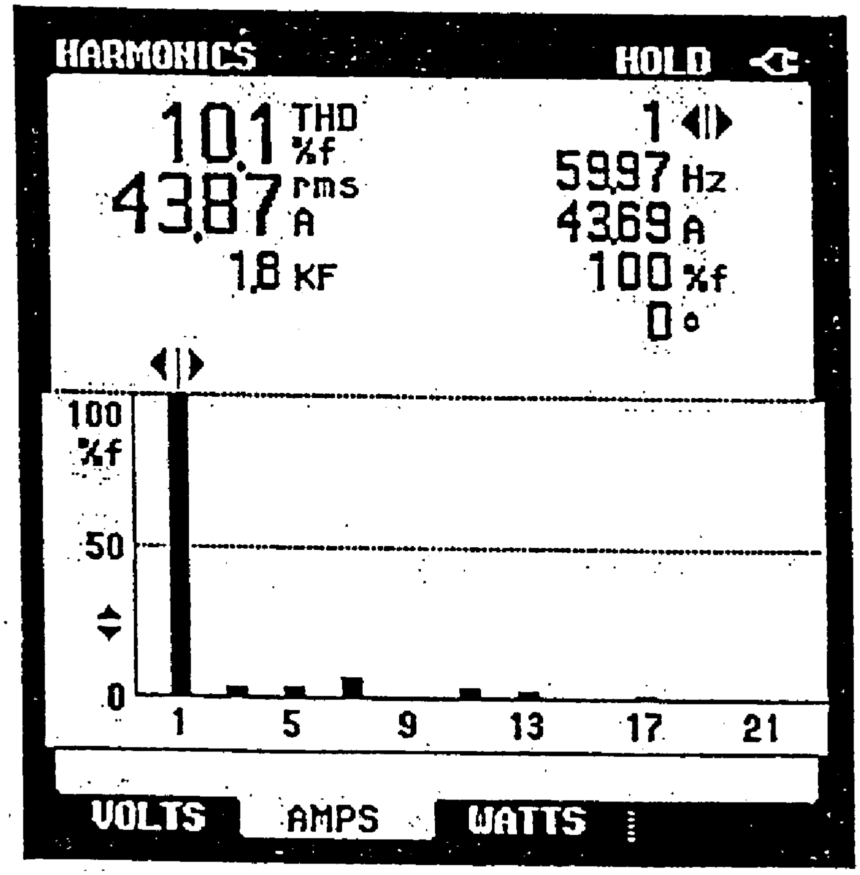
FIG. 10 shows a measurement of the line current total harmonic distortion of the system of FIG. 4.

FIG. 10 shows the measurement of the line current THD using a fluke 43 current THD analyzer. As can be seen from Table 1, the current through the main diode bridge forms a significant portion of the total line current. In this example, it provides more than 85% of the load power. As a result, system 10 provides an ideal retrofit solution for existing drives whose diode bridges are already rated for full load power. The remaining load power flows through the auxiliary diode bridge. In addition, the resultant current THD satisfies IEEE 519 recommendations for sources with impedances of 2% or less.

Figure 7:
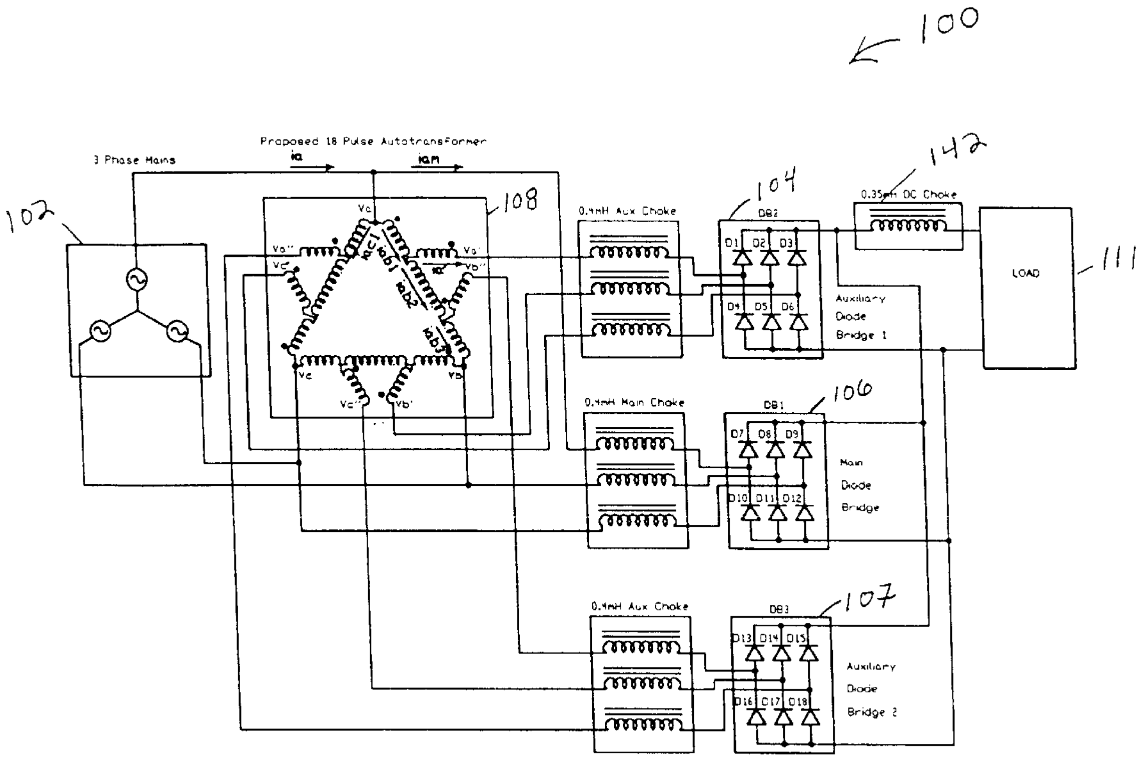
FIG. 7 is a schematic diagram of an autotransformer-based 18 pulse rectification scheme in accordance with the present invention.

FIG. 7 shows an autotransformer-based 18-pulse rectification system 100 in accordance with the present invention. The 18-pulse rectifier scheme is generated using a 9-phase system, which consists of three (3) sets of three phase voltages, each voltage set being balanced, with a phase-difference between the main three phase voltage set and the additional three phase voltage sets being approximately 20°. As with system 10, system 100 is operated by a three phase main power source 102 and is connected to a load 111 having a load power. The power source 102 has a main three phase voltage set consisting of $v_a$, $v_b$, and $v_c$ wherein each main phase voltage has a main voltage amplitude and a main voltage phase. System 100 includes a main diode bridge 104, a first auxiliary diode bride 106, a second auxiliary diode bridge 107, and an autotransformer 108. The main diode bridge 104 comprises three AC inputs and two DC outputs. In particular, three pairs of serially connected diodes are connected in parallel across the DC outputs, with the AC inputs connecting the power source 102 through the autotransformer 108 to the midpoints of each pair of serially connected diodes. The main diode bridge 104 carries a significant portion of the load power, preferably at least sixty-six (66) percent thereof, most of it directly from the main power source 102. The first and second auxiliary diode bridges 106 and 107 each also comprise three AC inputs and two DC outputs. In particular, each auxiliary diode bridge includes three pairs of serially connected diodes connected in parallel across their DC outputs, with their AC inputs connecting the autotransformer 108 to the midpoints of each pair of serially connected windings. The first and second auxiliary diode bridges carry the remainder of the load power (i.e., preferably no more than thirty-four (34) percent) and preferably divide the remainder of the load power equally.

Figure 8:
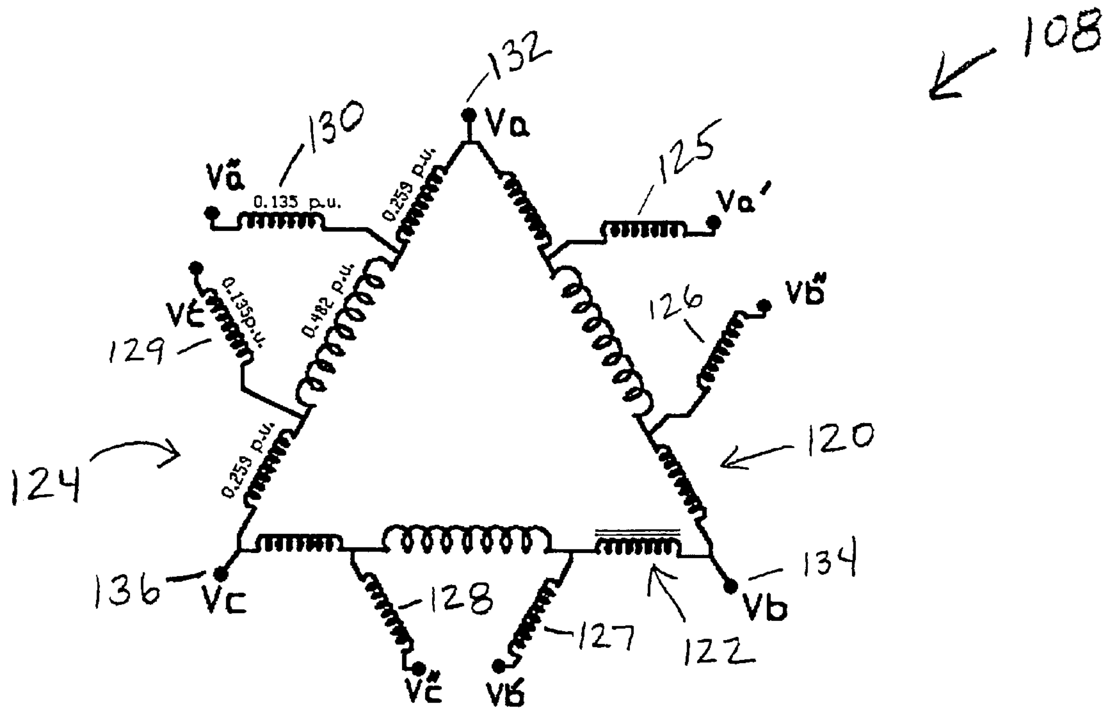
FIG. 8 is a schematic diagram of the autotransformer of FIG. 7.

Referring now to FIG. 8, the autotransformer 108 has three windings per phase. In particular, autotransformer 108 comprises a plurality of primary windings 120, 122 and 124 connected in a delta configuration, and a plurality of secondary windings 125, 126, 127, 128, 129 and 130, each secondary winding being electrically connected to a primary winding and magnetically coupled to a different primary winding. Each primary winding has a line voltage. In particular, primary winding 120 has a line voltage $V_{ab}$, primary winding 122 has a line voltage $V_{bc}$ and primary winding 124 has a line voltage $V_{ac}$. Secondary winding 125 is electrically connected to primary winding 120 and magnetically coupled to primary winding 122, secondary winding 126 is electrically connected to primary winding 120 and magnetically coupled to primary winding 124, secondary winding 127 is electrically connected to primary winding 122 and magnetically coupled to primary winding 124, secondary winding 128 is electrically connected to primary winding 122 and magnetically coupled to primary winding 120, secondary winding 129 is electrically connected to primary winding 124 and magnetically coupled to primary winding 120, and secondary winding 130 is electrically connected to primary winding 124 and magnetically coupled to primary winding 122. The autotransformer 108 connects to the power source 102 and the main diode bridge 104 through its apices 132, 134 and 136. In one embodiment, a choke 150, preferably having a value of approximately (0.05 p.u.) is connected between the power source 102 and each of the apices 132, 134 and 136. Alternatively, chokes similar to the main choke 38 and the auxiliary choke 40 of FIG. 4 can be connected between the main and first and second auxiliary diode bridges and the autotransformer. The autotransformer 108 connects to the first auxiliary diode bridge 106 through secondary windings 125, 127 and 129, and connects to the second auxiliary diode bridge 107 through secondary windings 126, 128 and 130.

The autotransformer generates two sets of three-phase auxiliary voltages, $v_a'$, $v_b'$, $v_c'$ and $v_a''$, $v_b''$, $v_c''$, the first and second auxiliary voltage amplitudes ranging between 0.73 and 0.78 times the main voltage amplitudes, the first auxiliary voltage phase ranging between 35 and 40 degrees leading with respect to the main voltage phase, and the secondary auxiliary voltage phase ranging between 35 and 40 degrees lagging with respect to the main voltage phase. Preferably, the first and second auxiliary voltages have an amplitude of 0.767, the first auxiliary voltage phase is 37 degrees leading with respect to the main voltage phase, and the second auxiliary voltage phase is 37 degrees lagging with respect to the main voltage phase. The following two sets of auxiliary voltages are generated assuming $v_a=1\angle 90$:

$$v_a'=0.764\angle 53$$

$$v_b'=0.764\angle 293$$

$$v_c'=0.732\angle 173$$

$$v_a''=0.764\angle 127$$

$$v_b''=0.764\angle 7$$

$$v_c''=0.764\angle 247$$

These voltages interact with the mains voltages ($v_a$, $v_b$, $v_c$) to produce the required additional six phases needed for 18 pulse rectification. These auxiliary voltages are generated from the appropriate line and phase voltages as follows:

$$v_a'=v_a+k_1*v_{ca}+k_2\cdot v_{cb}$$

$$v_b'=v_b+k_1*v_{ab}+k_2\cdot v_{ac}$$

$$v_c'=v_c+k_1*v_{bc}+k_2\cdot v_{ba}$$

$$v_a''=v_a+k_1*v_{ba}+k_2\cdot v_{bc}$$

$$v_b''=v_b+k_1*v_{cb}+k_2\cdot v_{ca}$$

$$v_c''=v_c+k_1*v_{ac}+k_2\cdot v_{ab}$$

where $k_1=0.259$ and $k_2=0.135$.

The autotransformer 108 is designed with each of its primary windings divided into three sections. Each primary winding has two taps; one at 0.259 times and the other at 0.741 times the line voltage. Each secondary winding is 0.135 times the line voltage. The secondary windings are connected to each of these taps as set forth previously herein.

The system of FIG. 7 will now be described in connection with a 230V, 15 HP G3-B Baldor electric drive connected through a 0.04 p.u. main power source choke while the dc choke is 0.04 p.u. Table 2 below contains values of the various parameters obtained at different motor loads:

TABLE 2

| Motor | Line current | | Main Diode Bridge | Aux. DB1 current | Aux. DB2 current | DC choke | |
|---|---|---|---|---|---|---|---|
| current | Rms | THD | current (A) | (A) | (A) | rms. | Dc |
| 22.7 | 17.3 | 13.1 | 15.4 | 5.6 | 7.2 | 20.7 | 20.4 |
| 26.7 | 21.4 | 11.4 | 16.4 | 7.4 | 9.7 | 27.4 | 27.2 |
| 31.9 | 26.9 | 9.0 | 20.1 | 9.3 | 10.8 | 34.1 | 33.9 |
| 36.7 | 31.1 | 8.3 | 24.9 | 10.6 | 11.9 | 39.3 | 39.1 |
| 41.5 | 36.2 | 6.9 | 28.4 | 12.2 | 13.4 | 45.4 | 45.2 |

Figure 11A:
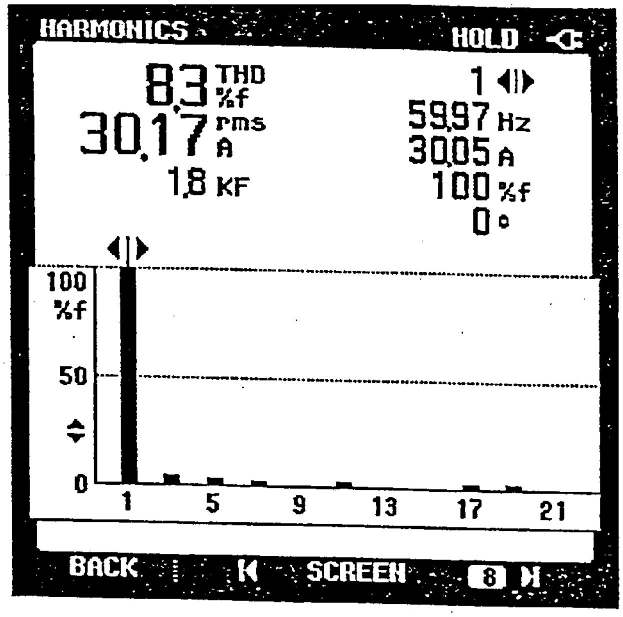
FIGS. 11A and 11B show measurements of the line current total harmonic distortion of the system of FIG. 7.
Figure 11B:
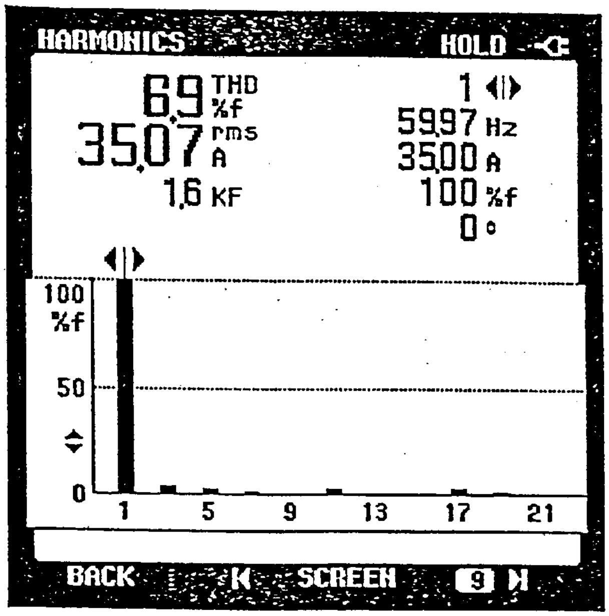

The line current THDs at 36.7A and 41.5A motor current are 8.3% and 6.9%, respectively. The measurement of this line current THD using a fluke 43 current THD analyzer is shown in FIGS. 11A and 11B. This is a considerable improvement over the 12-pulse rectifier scheme. It is to be noted, however, that the 18-pulse autotransformer is larger in size and has more number of secondary windings than the 12-pulse transformer. As a result, it is also more expensive.

While the invention has been shown with respect to twelve and eighteen pulse rectification systems, it can be appreciated that the invention covers any 2n pulse rectification system wherein n represents the number of phases thereof. As with the twelve and eighteen pulse systems, the 2n pulse system comprises a main diode bridge, $$\left(\frac{n}{3}-1\right)$$

auxiliary three phase diode bridges connected to the main diode bridge, and an autotransformer connected to the main diode bridge and the auxiliary diode bridge. The main diode bridge comprises three AC inputs and two DC outputs. In particular, three pairs of serially connected diodes are connected in parallel across the DC outputs, with the AC inputs connecting to the power source through the autotransformer to the midpoints of each pair of serially connected diodes. The main diode bridge carries the majority of the load power, most of it directly for the power source. Each auxiliary diode bridge also comprises three AC inputs and two DC outputs. In particular, three pairs of serially connected diodes are connected in parallel across the DC outputs, with the AC inputs connecting the autotransformer to the midpoints of each pair of serially connected diodes. The auxiliary diode bridges carry the remainder of the load power substantially equally across each auxiliary diode bridge.

The 2n-pulse system may include a main choke connected between the power source and the main diode bridge, and an auxiliary choke connected between each auxiliary diode bridge and the autotransformer to act as a filter to further reduce the harmonics of the system. Alternatively, a choke may be connected between the power source and the autotransformer.

The autotransformer comprises a plurality of primary windings connected in a delta configuration, and (n−3) secondary windings, each of the secondary windings being electrically connected to a primary winding and magnetically coupled to a different primary winding. In particular, a 2n pulse rectification system requires the generation of $$\frac{n}{3}$$

three-phase voltage sets, each set having three voltages 120° out of phase with respect to each other and equal in amplitude, and each being phase-shifted $$\frac{180^\circ}{n}$$

with respect to the adjacent set. The three-phase voltage set generated from the main power source is used as the main voltage set. The autotransformer produces $$\left(\frac{n}{3}-1\right)$$

three-phase auxiliary voltage sets with the appropriate amplitude and phase shift with respect to the corresponding main phase voltage such that the interaction of the main voltage set and the $\left(\frac{n}{3}-1\right)$ auxiliary voltage sets provides the remaining $\left(\frac{n}{3}-1\right)$ three-phase voltage sets required for 2n-pulse rectification. The auxiliary voltage amplitudes and phases are chosen such that the interaction amongst them does not play any role in the rectification process.

In order to determine the necessary auxiliary voltage amplitude, k, and auxiliary voltage phase, α, required to achieve the 2n pulse rectification desired, it is assumed that the mains 3-phase voltages have the following phase and amplitude relationships:

$v_a=1\angle 90$ $v_b=1\angle 330$ $v_c=1\angle 210$

The auxiliary voltage amplitude, k, is determined from the following equation:

$$k=\sqrt{4+2\sqrt{3}\cos\left(\theta-\frac{7\pi}{6}\right)},\text{ where }\theta=\frac{180^\circ}{n}$$

and its integral multiples for all possible real values of k.

Table 3 below lists the values of the auxiliary voltage amplitudes obtained for a rectifiction system having 6, 9, and 12 phases.

TABLE 3

| Number of phases n | Number of pulses 2 n | θ (deg.) | k | Number of auxiliary voltage sets |
|---|---|---|---|---|
| 6 | 12 | 30 | 0.732 | 1 |
| 9 | 18 | 20 | 0.767, 0.767 | 2 |
| 12 | 24 | 15 | 0.808, 0.808 and 0.732 | 3 |

The auxiliary voltage phase, α, is determined from the following equation:

$$\alpha=\sin^{-1}\left(\frac{\sqrt{3}\ \sin\theta-0.5}{k}\right)$$

Tabel 4 below lists the values of auxiliary voltage phases obtained for a rectification system having 6, 9 and 12 phases.

TABLE 4

| Number of phases n | Number of pulses 2 n | θ (deg.) | K | α (deg.) |
|---|---|---|---|---|
| 6 | 12 | 30 | 0.732 | 30 |
| 9 | 18 | 20 | 0.767, 0.767 | 6.9, 53 |
| 12 | 24 | 15 | 0.808, 0.808 and 0.732 | −3.66, 26.9, 63.73 |

The remaining auxiliary voltages in a balanced three-phase voltage set have the same value of k (i.e. same amplitude), but lead the first auxiliary voltage by 240° and 120°, respectively. Thus a complete set of auxiliary voltages consisting of $v_a'$, $v_b'$, $v_c'$ is obtained as follows:

$v_a'=k\angle\alpha$ $v_b'=k\angle(240+\alpha)$ $v_c'=k\angle(120+\alpha)$

Table 5 below enumerates all of the sets of 3-phase auxiliary voltages obtained for a 6, 9 and 12 phase rectification system.

TABLE 5

| Number of phases n | k | α (deg.) | Auxiliary voltage sets |
|---|---|---|---|
| 6 | 0.732 | 30 | 0.732 ∠ 30, 0.732 ∠ 150, 0.732 ∠ 270 |
| 9 | 0.767, 0.767 | 6.9, 53.1 | Set 1-[0.767 ∠ 6.9, 0.767 ∠ 126.9, 0.767 ∠ 246.9] Set 2-[0.767 ∠ 53.1, 0.767 ∠ 173.1, 0.767 ∠ 293.1] |
| 12 | 0.808, 0.732 and 0.808 | −3.66, 26.9, 63.73 | Set 1-[0.808 ∠ −3.66, 0.808 ∠ 116.34, 0.808 ∠ 236.34] Set 2-[0.732 ∠ 26.9, 0.732 ∠ 146.9, 0.732 ∠ 266.9] Set 3-[0.808 ∠ 63.73, 0.808 ∠ 183.73, 0.808 ∠ 303.73] |

The phase shift, δ, between a particular auxiliary voltage set and the mains voltage set is determined by the following equation:

$\delta=\min\{|90-\alpha|, |30+\alpha|\}$

Table 6 below shows the phase difference for a 6, 9 and 12 phase rectification system.

TABLE 6

| Number of phases n | Number of pulses 2 n | α (deg.) | δ (deg.) |
|---|---|---|---|
| 6 | 12 | 30 | 60 |
| 9 | 18 | 6.9, 53.1 | 36.9, 36.9 |
| 12 | 24 | −3.66, 26.9, 63.73 | 26.34, 56.9, 26.27 |

The invention requires $\frac{n}{3}$ three-phase diode bridges for 2n pulse rectification. A main diode-bridge is connected directly to the main power source, while an auxiliary diode bridge is connected to each of the three-phase auxiliary voltage sets of the autotransformer. The nature of the main and auxiliary voltage sets results in the diode bridges carrying unequal power, with the main diode bridge carrying more than each auxiliary diode bridge. In particular, for an n-pulse recitification system, the main diode bridge power rating, $P_{mdb}$, is as follows:

$$P_{mdb} \geq \left(\frac{n+3}{2n}\right) * P_d,$$

where $P_d$ represents the load power. The auxiliary diode bridges share the remaining load power substantially equally amongst themselves. In particular, each auxiliary diode bridge has a power rating, $P_{auxdb}$ as follows:

$$P_{auxdb} \leq \left(\frac{3}{2n}\right) * P_d$$

Figure 1:
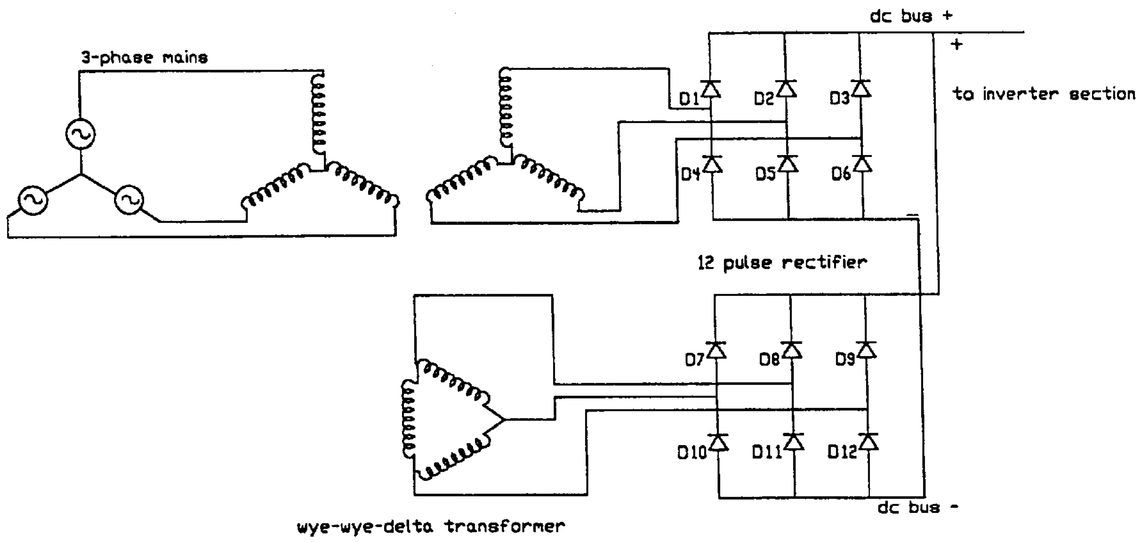
Fig. 1 Prior Art
FIG. 1 is a schematic diagram of a conventional wye-wye-delta transformer-based 12 pulse rectification scheme.
Figure 2:
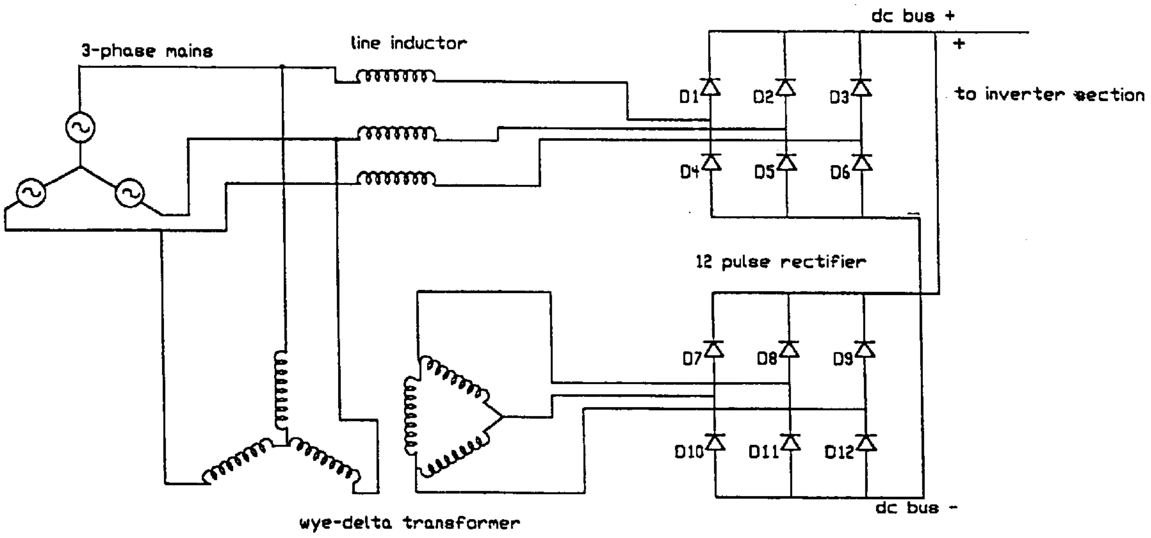
Fig. 2 Prior Art
FIG. 2 is a schematic diagram of a conventional wye-delta transformer-based 12 pulse rectification scheme.
Figure 3:
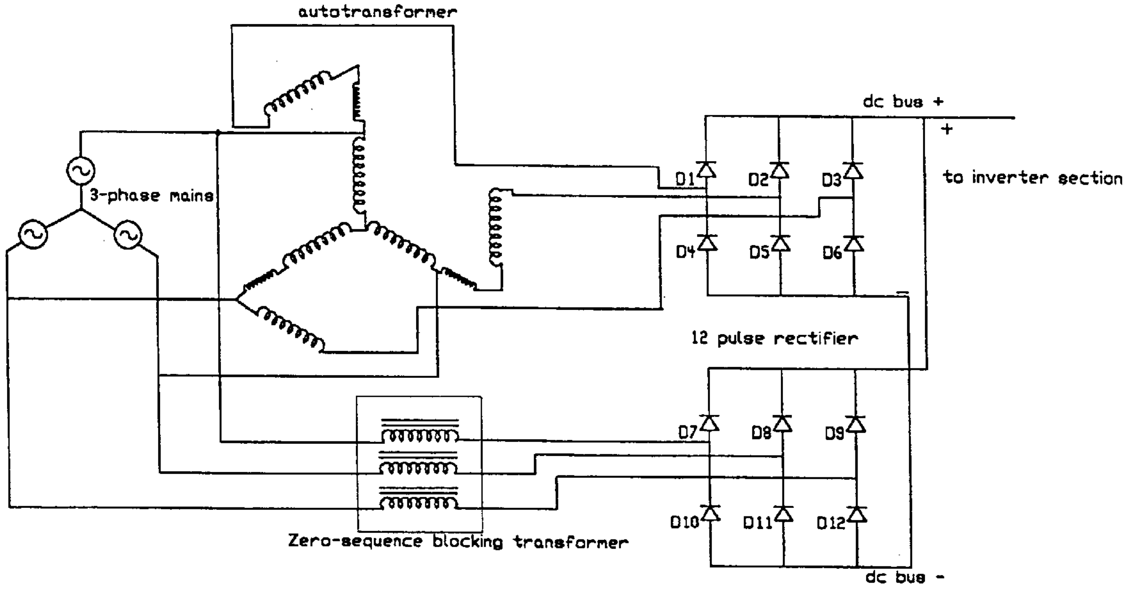
Fig. 3 Prior Art
FIG. 3 is a schematic diagram of an autotransformer-based 12 pulse rectification scheme.
Figure 9:
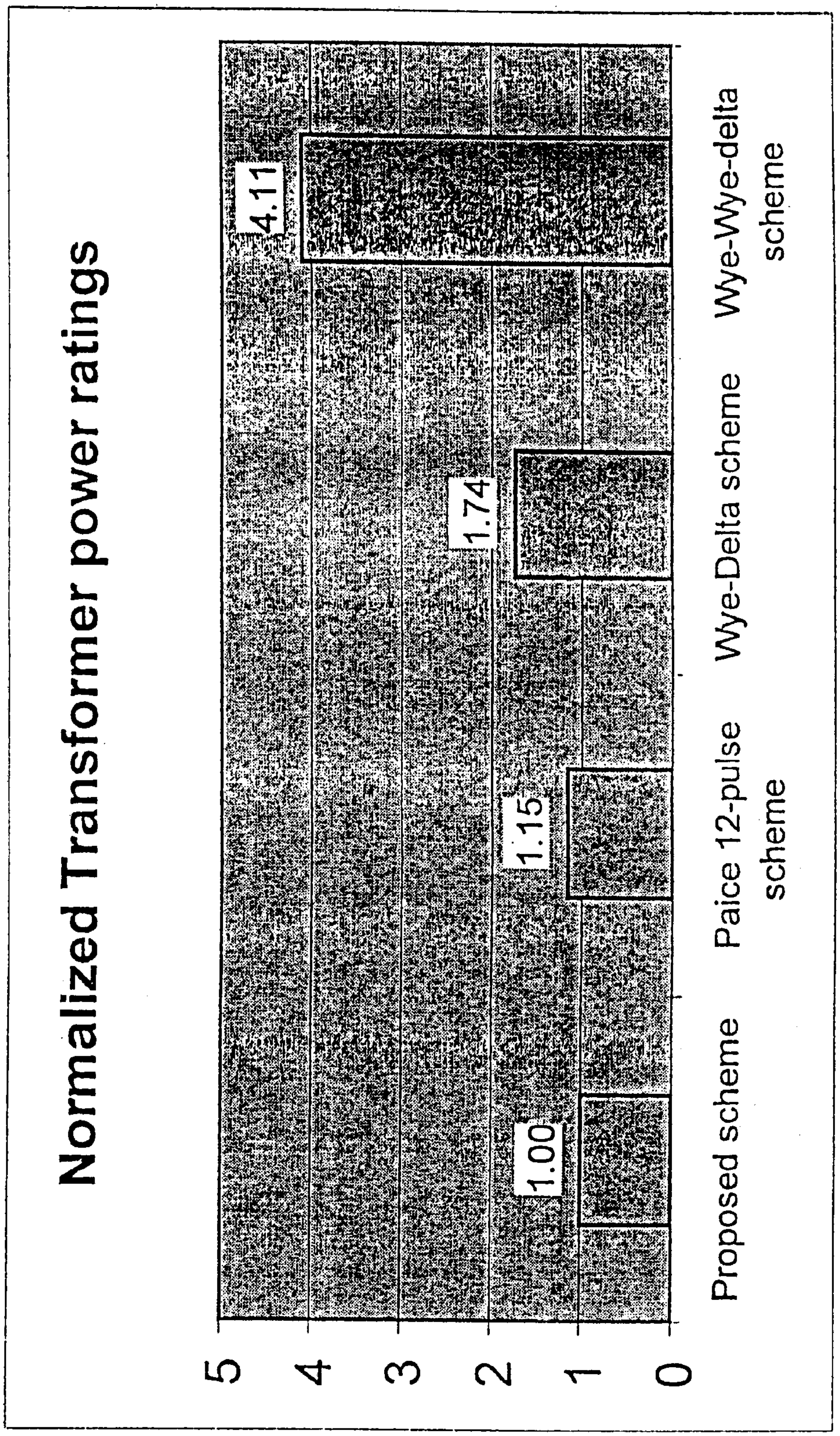
FIG. 9 is a chart evaluating normalized transformer power ratings of the existing rectification systems of FIG. 1, FIG. 2, FIG. 3 and that of FIG. 4.

An evaluation of the power ratings of the transformers used in the existing twelve pulse rectification of FIGS. 1, 2 and 3 compared with that of the present invention is shown in FIG. 9. This evalution is conducted assuming a constant current load, $I_d$, and calculating the transformer power rating by summing up the power ratings of all the windings present in the autotransformer. The power rating for each winding is calculated by taking the product of its root mean square current and voltage.

Table 7 below contains both the absolute and normalized values of the transformer power ratings for these schemes, where $V_1$=system line voltage. The normalized ratings are calculated using the system of the present invention as the base (i.e., 1 p.u.).

TABLE 7

| Description of scheme | Transformer rating $*V_lI_d$ | Normalized transformer power ratings proposed scheme = 1 p.u.) |
|---|---|---|
| Present Invention | 0.81 | 1 |
| FIG. 3 | 0.935 | 1.154 |
| FIG. 2 | 1.412 | 1.745 |
| FIG. 1 | 3.33 | 4.11 |

With respect to the scheme displayed in FIG. 3, several assumptions have been made in estimating the rating of the zero-sequence current blocking transformer. Since the voltage across the zero-sequence transformer winding is predominantly third harmonic, the iron lamination quantity used is a third of the normal requirement. The current rating of each winding used is half the root mean square rating of the total line current. Based on these assumptions, the rating of this transformer is $0.06V_LI_d$. The main transformer wound on a normal 3 limb core has a rating of $0.875*V_1I_d$. Thus the cumulative transformer power rating of $0.935*V_1I_d$. As can be seen, the autotransformer of the present invention has the lowest power rating, and is thus the least expensive.

In view of the foregoing, it will be seen that the several advantages of the invention are achieved and attained. The embodiments were chosen and described in order to best explain the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

I claim:

1. A system for reducing harmonics in a circuit, the circuit being powered by a main three phase power source having a main three phase voltage set, each main phase voltage having a main voltage amplitude and a main voltage phase, the system comprising:

main rectifier means having a main rectifier output;

auxiliary rectifier means connected directly to the main rectifier output of the main rectifier means; and an autotransformer connected to the main rectifier means and the auxiliary rectifier means, the autotransformer having a delta configuration and adapted to generate a set of auxiliary voltages isolated from the main three phase voltage set, each auxiliary voltage having an auxiliary voltage amplitude and phase, the auxiliary voltage amplitude ranging between 0.70 and 0.75 times the main voltage amplitude, and the auxiliary voltage phase ranging between 55 and 65 degrees out of phase with the main voltage phase, whereby twelve pulse rectification is achieved.

2. The system of claim 1, wherein the autotransformer comprises:

a plurality of primary windings connected in a delta configuration; and a plurality of secondary windings, each of the secondary windings being electrically connected to a primary winding and magnetically coupled to a different primary winding.

3. The system of claim 2, wherein the plurality of primary windings comprises a first primary winding, a second primary winding and a third primary winding, and the plurality of secondary windings comprises a first secondary winding, a second secondary winding and a third secondary winding, and wherein the first secondary winding is electrically connected to the first primary winding and magnetically coupled to the third primary winding, the second secondary winding is electrically connected to the second primary winding and magnetically coupled to the first primary winding, and the third secondary winding is electrically connected to the third primary winding and magnetically coupled to the second primary winding.

4. The system of claim 2, wherein the main rectifier means and the auxiliary rectifier means are three phase diode bridges, each having ac input means and dc output means such that the ac input means of the main diode bridge is connected to the main power source via the primary windings of the autotransformer, the ac input means of the auxiliary diode bridge is connected to the secondary windings of the autotransformer, and the dc output means of the main diode bridge and the auxiliary diode bridge are connected in parallel.

5. The system of claim 1, further comprising a choke connected between the power source and the autotransformer.

6. The system of claim 1, further comprising a main choke connected between the autotransformer and the main rectifier means and an auxiliary choke connected between the autotransformer and the auxiliary rectifier means.

7. The system of claim 1, wherein the main rectifier means has a main rectifier power and the auxiliary rectifier means has an auxiliary rectifier power such that the main rectifier power and the auxiliary rectifier power are not substantially equal.

8. The system of claim 1, wherein the system is adapted to connect to a load having a load power, and wherein the main rectifier power is at least seventy-five percent of the load power.

9. The system of claim 1, wherein the autotransformer comprises:

a plurality of primary windings connected in a delta configuration, each primary winding having a first end and a second end; and a plurality of secondary windings, each secondary winding being electrically connected to a primary winding between its first end and second end.

10. A system for reducing harmonics in a circuit, the circuit being powered by a main three phase power source having a main three phase voltage set, each main phase voltage having a main voltage amplitude and a main voltage phase, the system comprising:

main rectifier means;

first auxiliary rectifier means connected to the main rectifier means;

second auxiliary rectifier means connected to the main rectifier means and the first auxiliary rectifier means; and an autotransformer connected to the main rectifier means, the first auxiliary rectifier means, and the second auxiliary rectifier means, the autotransformer adapted to generate a first and second set of auxiliary voltages, each first set of auxiliary voltages having a first auxiliary voltage amplitude and a first auxiliary voltage phase and each second set of auxiliary voltages having a second auxiliary voltage amplitude and a second auxiliary voltage phase, the first and second auxiliary voltage amplitude ranging between 0.73 and 0.78 times the main voltage amplitude, and the first auxiliary voltage phase ranging between 35 and 40 degrees leading with respect to the main voltage phase, and the second auxiliary voltage phase being between 35 and 40 degrees lagging with respect to the main voltage phase, whereby eighteen pulse rectification is achieved.

11. The system of claim 10, wherein the autotransformer comprises:

a plurality of primary windings connected in a delta configuration, each primary winding having a first end and a second end; and a plurality of secondary windings, each of the secondary windings being electrically connected to a primary winding between its first end and second end and magnetically coupled to a different primary winding.

12. The system of claim 11, wherein the plurality of primary windings comprises a first primary winding, a second primary winding and a third primary winding, and the plurality of secondary windings comprises a first secondary winding, a second secondary winding, a third secondary winding, a fourth secondary winding, a fifth secondary winding and a sixth secondary winding, and wherein the first secondary winding is electrically connected to the first primary winding and magnetically coupled to the third primary winding, the second secondary winding is electrically connected to the second primary winding and magnetically coupled to the first primary winding, the third secondary winding is electrically connected to the third primary winding and magnetically coupled to the second primary winding, the fourth secondary winding is electrically connected to the first primary winding and magnetically coupled to the second primary winding, the fifth secondary winding is electrically connected to the second primary winding and magnetically coupled to the third primary winding, and the sixth secondary winding is electrically connected to the third primary winding and magnetically coupled to the first primary winding.

13. The system of claim 10, further comprising a choke connected between the power source and the autotransformer.

14. The system of claim 10, wherein the main rectifier means, the first auxiliary rectifier means and the second auxiliary rectifier are three phase diode bridges, each having ac input means and dc output means such that the ac input means of the main rectifier means is connected to the main power source via the primary windings of the autotransformer, the ac input means of the first auxiliary rectifier means is connected to the first, second and third secondary windings of the autotransformer, the ac input means of the second auxiliary rectifier means is connected to the fourth, fifth and sixth secondary windings of the autotransformer, and the dc output means of the main diode bridge, the first auxiliary diode bridge, and the second auxiliary diode bridge are connected in parallel.

15. The system of claim 10, wherein the main rectifier means has a main rectifier power, the first auxiliary rectifier means has a first auxiliary rectifier power, and the second auxiliary rectifier means has a second auxiliary rectifier power such that the main rectifier means power is not substantially equal to either the first or second auxiliary rectifier means power.

16. The system of claim 15, wherein the system is adapted to connect to a load having a load power, and wherein the main rectifier power is at least 66 percent of the load power.

17. The system of claim 16, wherein the remainder of the load power is shared substantially equally between the first auxiliary rectifier means and the second auxiliary rectifier means.

18. The system of claim 10, further comprising a main choke connected between the autotransformer and the main rectifier means, a first auxiliary choke connected between the autotransformer and the first auxiliary rectifier means, and a second auxiliary choke connected between the autotransformer and the second auxiliary rectifier means.

19. A system for reducing harmonics in a circuit, comprising:

main rectifier means having a main rectifier means power;

first auxiliary rectifier means having a first auxiliary rectifier power and connected to the main rectifier means;

second auxiliary rectifier means having a second auxiliary rectifier power and connected to the main rectifier means and the first auxiliary rectifier means; and an autotransformer connected to the main rectifier means, the first auxiliary rectifier means, and the second auxiliary rectifier means, the autotransformer being adapted to generate a set of auxiliary voltages such that the main rectifier power is not substantially equal to either the first or second auxiliary rectifier power.

20. A system for reducing harmonics in a circuit, the circuit being powered by a main three phase power source having a main three phase voltage set comprising:

main rectifier means having a main rectifier means power and a main rectifier output;

auxiliary rectifier means having an auxiliary rectifier power and connected directly to the main rectifier output of the main rectifier means; and an autotransformer connected to the main rectifier means and the auxiliary rectifier means, the autotransformer having a delta configuration and being adapted to generate a set of auxiliary voltages isolated from the main three phase voltage set such that the main rectifier power is not substantially equal to the auxiliary rectifier power.

21. A system for reducing harmonics in a circuit, the circuit being powered by a main three phase power source having a main three phase voltage set, each main phase voltage having a main voltage amplitude and a main voltage phase, the system comprising:

main rectifier means;

auxiliary rectifier means connected to the main rectifier means; and an autotransformer connected to the main rectifier means and the auxiliary rectifier means, the autotransformer having a plurality of primary windings connected in a delta configuration, each primary winding having a first end and a second end, and a plurality of secondary windings, each secondary winding being electronically connected to a primary winding between its first end and second end, the autotransformer being further adapted to generate a set of auxiliary voltages, each auxiliary voltage having an auxiliary voltage amplitude and phase, the auxiliary voltage amplitude ranging between 0.70 and 0.75 times the main voltage amplitude, and the auxiliary voltage phase ranging between 55 and 65 degrees out of phase with the main voltage phase, whereby twelve pulse rectification is achieved.

22. An autotransformer-based 2n-pulse rectification system having n phases for connection to a load having a load power and being powered by a main three phase power source having a main three phase voltage set, comprising:

main rectifier means connected directly to the main three phase power source and having a main rectifier power rating, $P_{mdb}$, wherein $$P_{mdb} \geq \left(\frac{n+3}{2n}\right)$$

times the load power and a main rectifier output;

$$\left(\frac{n}{3}-1\right)$$

auxiliary rectifier means connected directly to the main three phase power source and the main rectifier output of the main rectifier means and having an auxiliary rectifier power rating, $P_{auxdb}$, wherein $$P_{auxdb} \leq \left(\frac{3}{2n}\right)$$

times the load power; and an autotransformer having a delta configuration and connected to the main rectifier means and the auxiliary rectifier means, and adapted to generate a set of auxiliary voltages isolated from the main three phase voltage set.

23. The system of claim 22, wherein the autotransformer comprises:

a plurality of primary windings connected in a delta configuration; and a plurality of secondary windings, each of the secondary windings being electrically connected to a primary winding and magnetically coupled to a different primary winding.

24. The system of claim 23, wherein the main rectifier means and the ((n/3)−1) auxiliary rectifier means are three phase diode bridges, each having ac input means and dc output means such that the ac input means of the main diode bridge is connected to the main power source via the primary windings of the autotransformer, and the ac input means of each $$\left(\frac{n}{3}-1\right)$$

auxiliary diode bridge is connected to the secondary windings of the autotransformner, and the dc output means of the main diode bridge and each $$\left(\frac{n}{3}-1\right)$$

auxiliary diode bridge are connected in parallel.

25. The system of claim 22, further comprising a main choke connected between the autotransformer and the main rectifier means and $$\left(\frac{n}{3}-1\right)$$

auxiliary chokes connected between the autotransformer and the $$\left(\frac{n}{3}-1\right)$$

auxiliary rectifier means.

26. The system of claim 22, further comprising a choke connected between the power source and the autotransformer.

27. The system of claim 22, wherein the autotransformer comprises:

a plurality of primary windings connected in a delta configuration, each primary winding having a first end and a second end; and a plurality of secondary windings, each secondary winding being electrically connected to a primary winding between its first end and second end.

28. An autotransformer-based 2n-pulse rectification system having n phases and being powered by a main three phase power source having a main three phase voltage set, each main three phase voltage set having a main voltage amplitude and a main voltage phase, the system comprising:

main rectifier means having a main rectifier output;

$$\left(\frac{n}{3}-1\right)$$

auxiliary rectifier means connected to the main rectifier output of the main rectifier means; and an autotransformer connected to the main rectifier means and the auxiliary rectifier means, the autotransformer having a delta configuration adapted to generate $$\left(\frac{n}{3}-1\right)$$

auxiliary voltage sets isolated from the main three phase voltage set, each auxiliary voltage set having an auxiliary voltage amplitude, k, and an auxiliary voltage phase, α, wherein $$k=\sqrt{4+2\sqrt{3}\cos\left(\theta-\frac{7\pi}{6}\right)}$$

and wherein $$\alpha=\sin^{-1}\left(\frac{\sqrt{3}\sin\theta-0.5}{k}\right)$$

assuming a main voltage amplitude of one and a main voltage phase of ninety degrees, wherein $$\theta=\frac{180^\circ}{n}$$

and its integral multiples for all possible real values of k.

29. The system of claim 28, wherein the autotransformer comprises:

a plurality of primary windings connected in a delta configuration; and (n−3) secondary windings, each of the secondary windings being electrically connected to a primary winding and magnetically coupled to a different primary winding.

30. The system of claim 29, wherein the main rectifier means and the $$\left(\frac{n}{3}-1\right)$$

auxiliary rectifier means are three phase diode bridges, each having ac input means and dc output means such that the ac input means of the main diode bridge is connected to the main power source via the primary windings of the autotransformer, and the ac input means of each $$\left(\frac{n}{3}-1\right)$$

auxiliary diode bridge is connected to the secondary windings of the autotransformer, and the dc output means of the main diode bridge and each $$\left(\frac{n}{3}-1\right)$$

auxiliary diode bridge are connected in parallel.

31. The system of claim 28, further comprising a choke connected between the power source and the autotransformer.

32. The system of claim 28, further comprising a main choke connected between the autotransformer and the main rectifier means and $$\left(\frac{n}{3}-1\right)$$

auxiliary chokes connected between the autotransformer and the n auxiliary rectifier means.

33. The system of claim 28, wherein the autotransformer comprises:

a plurality of primary windings connected in a delta configuration, each primary winding having a first end and a second end; and (n−3) secondary windings, each secondary winding being electronically connected to a primary winding between its first end and second end.

34. A system for reducing harmonics in a circuit, the circuit being powered by a main three phase power source having a main three phase voltage set, each main phase voltage having a main voltage amplitude and a main voltage phase, the system comprising:

main rectifier means;

first auxiliary rectifier means connected to the main rectifier means;

second auxiliary rectifier means connected to the main rectifier means and the first auxiliary rectifier means; and an autotransformer connected to the main rectifier means, the first auxiliary rectifier means, and the second auxiliary rectifier means, the autotransformer having a plurality of primary windings connected in a delta configuration, each primary winding having a first end and a second end, and a plurality of secondary windings, each secondary winding being electronically connected to a primary winding between its first end and second end, the autotransformer being further adapted to generate a first and second set of auxiliary voltages, each first set of auxiliary voltages having a first auxiliary voltage amplitude and a first auxiliary voltage phase and each second set of auxiliary voltages having a second auxiliary voltage amplitude and a second auxiliary voltage phase, the first and second auxiliary voltage amplitude ranging between 0.73 and 0.78 times the main voltage amplitude, and the first auxiliary voltage phase ranging between 35 and 40 degrees leading with respect to the main voltage phase, and the second auxiliary voltage phase being between 35 and 40 degrees lagging with respect to the main voltage phase, whereby eighteen pulse rectification is achieved.

35. A system for reducing harmonics in a circuit, comprising:

main rectifier means having a main rectifier means power;

auxiliary rectifier means having an auxiliary rectifier power and connected to the main rectifier means; and an autotransformer connected to the main rectifier means and the auxiliary rectifier means, the autotransformer having a plurality of primary windings connected in a delta configuration, each primary winding having a first end and a second end, and a plurality of secondary windings, each secondary winding being electronically connected to a primary winding between its first end and second end, the autotransformer being further adapted to generate a set of auxiliary voltages such that the main rectifier power is not substantially equal to the auxiliary rectifier power.

36. An autotransformer-based 2n-pulse rectification system having n phases and being powered by a main three phase power source having a main three phase voltage set, each main three phase voltage set having a main voltage amplitude and a main voltage phase, the system comprising:

main rectifier means;

$$\left(\frac{n}{3}-1\right)$$

auxiliary rectifier means connected to the main rectifier means; and an autotransformer connected to the main rectifier means and the auxiliary rectifier means, the autotransformer having a plurality of primary windings connected in a delta configuration, each primary winding having a first end and a second end, and a plurality of secondary windings, each secondary winding being electronically connected to a primary winding between its first end and second end, the autotransformer being further adapted to generate $$\left(\frac{n}{3}-1\right)$$

auxiliary voltage sets, each auxiliary voltage set having an auxiliary voltage amplitude, k, and an auxiliary voltage phase, α, wherein $$k=\sqrt{4+2\sqrt{3}\cos\left(\theta-\frac{7\pi}{6}\right)}$$

and wherein $$\alpha=\sin^{-1}\left(\frac{\sqrt{3}\sin\theta-0.5}{k}\right)$$

assuming a main voltage amplitude of one and a main voltage phase of ninety degrees, wherein $$\theta=\frac{180°}{n}$$

and its integral multiples for all possible real values of k.

37. An autotransformer-based 2n-pulse rectification system having n phases for connection to a load having a load power, comprising:

main rectifier means having a main rectifier power rating, $P_{mdb}$, wherein $$P_{mdb}\geq\left(\frac{n+3}{2n}\right)$$

times the load power;

$$\left(\frac{n}{3}-1\right)$$

auxiliary rectifier means connected to the main rectifier means and having an auxiliary rectifier power rating, $P_{auxdb}$, wherein $$P_{auxdb}\leq\left(\frac{3}{2n}\right)$$

times the load power; and an autotransformer connected to the main rectifier means and the auxiliary rectifier means and having a plurality of primary windings connected in a delta configuration, each primary winding having a first end and a second end, and a plurality of secondary windings, each secondary winding being electronically connected to a primary winding between its first end and second end.

* * * * *

UNITED STATES PATENT AND TRADEMARK OFFICE

CERTIFICATE OF CORRECTION

PATENT NO. : 6,498,736 B1

DATED : December 24, 2002

INVENTOR(S) : Girish Radhakrishna Kamath

It is certified that error appears in the above-identified patent and that said Letters Patent is hereby corrected as shown below:

Column 5,
Line 14, delete "C".

Column 13,
Line 56, replace "Tabel 4" with -- Table 4 --.

Signed and Sealed this

Eighteenth Day of March, 2003

JAMES E. ROGAN
*Director of the United States Patent and Trademark Office*